2 Sheets--Sheet 1.
J. F. TAPLEY.
Paper-Ruling Machines.
No. 6,096. Reissued Oct. 20, 1874.
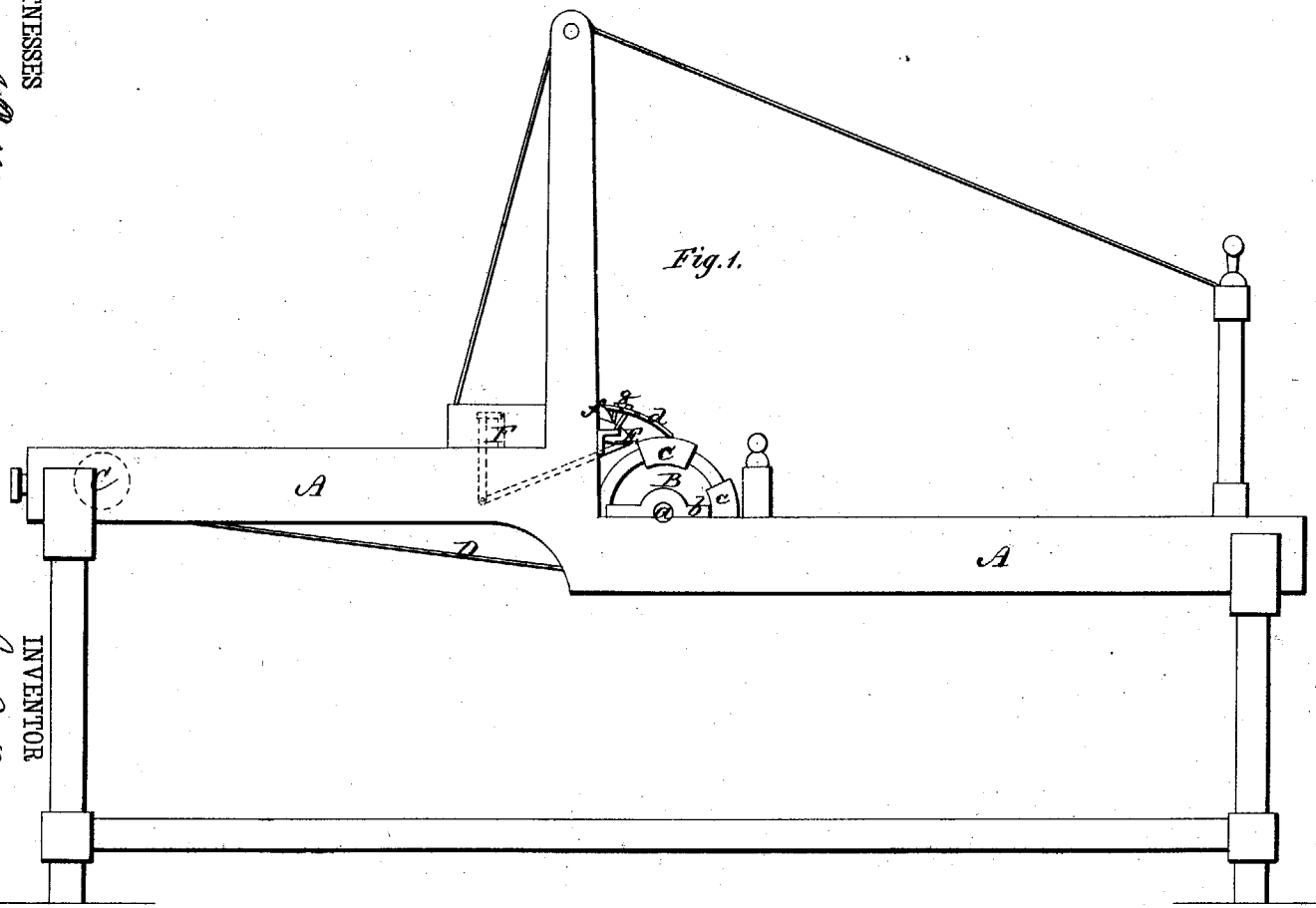
WITNESSES
Henry N. Miller
C. L. Everts.
INVENTOR
J. F. Tapley
per Alexander Mason
Attorneys
THE GRAPHIC CO. PHOTO-LITH. 39 & 41 PARK PLACE, N.Y.

2 Sheets--Sheet 2.
J. F. TAPLEY.
Paper-Ruling Machines.
No. 6,096. Reissued Oct. 20, 1874.
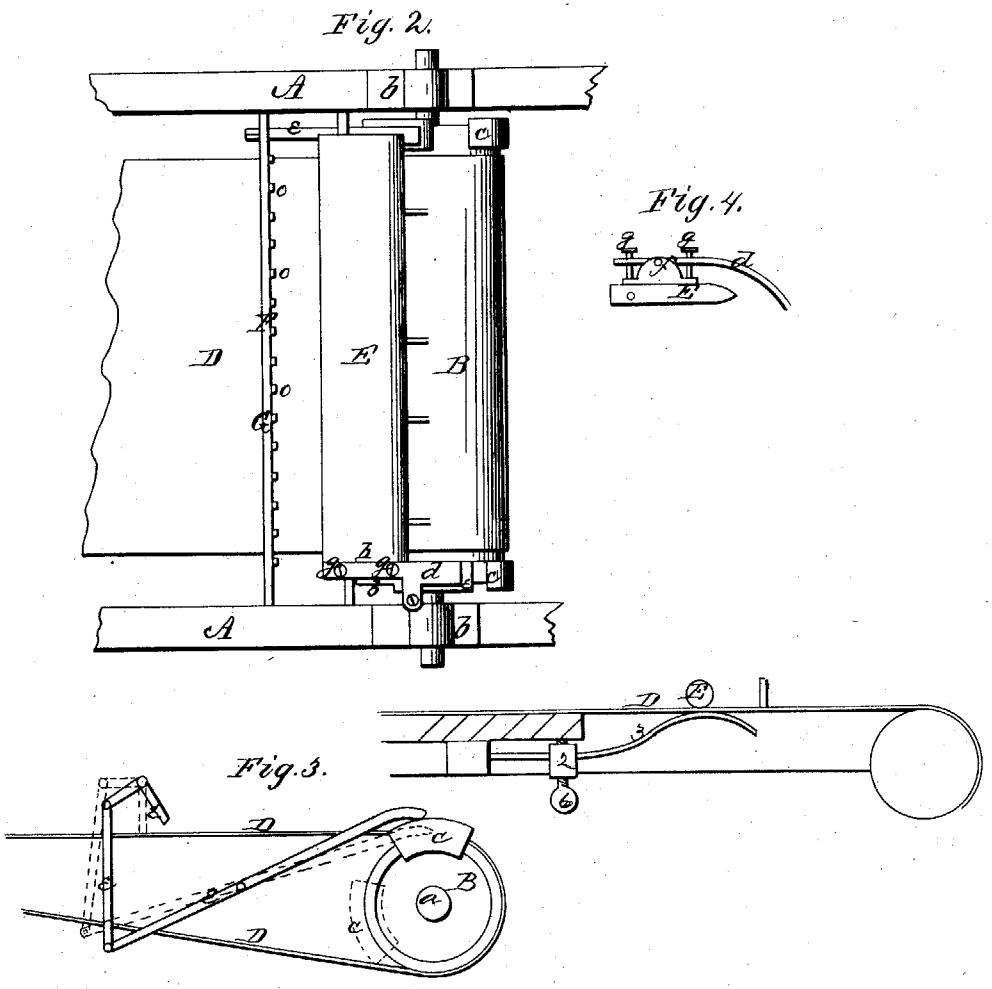
WITNESSES
Henry A. Miller
C. L. Ewert
INVENTOR
J. F. Tapley
per
Chas. E. Emerson
Attorneys
THE GRAPHIC CO. PHOTO-LITH. 39 & 41 PARK PLACE, N.Y.

UNITED STATES PATENT OFFICE.

JESSE F. TAPLEY, OF SPRINGFIELD, MASSACHUSETTS.

IMPROVEMENT IN PAPER-RULING MACHINES.

Specification forming part of Letters Patent No. 73,669, dated January 21, 1868; reissue No. 6,096, dated October 20, 1874; application filed August 18, 1874.

*To all whom it may concern:*

Be it known that I, JESSE F. TAPLEY, of Springfield, in the county of Hampden and State of Massachusetts, have invented certain new and useful Improvements in Paper-Ruling Machines; and I do hereby declare that the following is a full, clear, and exact description thereof, reference being had to the accompanying drawings, and to the letters of reference marked thereon, which form a part of this specification.

The nature of my invention consists in the combination, in a pen ruling-machine having a frame supporting an endless belt carried around two or more revolving rollers, of a revolving cylinder, arranged upon the frame inside of the endless belt, over which the paper is carried, one or more sets of cams or projections revolving with said cylinder; a hinged or pivoted pen-bar placed over the cylinder, and operated by the cams or projections revolving therewith, and a hinged or pivoted gate placed crosswise of the frame of the machine in front of the cylinder, and operated by the cams or projections on said cylinder, all as hereinafter more fully set forth.

In order to enable others skilled in the art to which my invention appertains to make and use the same, I will now proceed to describe its construction and operation, referring to the annexed drawings, in which—

Figure 1 is a side elevation of a ruling-machine embodying my improvements. Fig. 2 is a plan view of said improvements, and Figs. 3 and 4 are detail views of parts of the same.

In construction I form my device of a frame, A A, having near its center a drum, B, on a shaft, *a*, which works in bearings *b b'* upon the sides of the frame. Over this drum-cylinder B, and also over a smaller one, C, (shown by dotted lines,) near one end of the frame A A, is an endless belt, D, which feeds the stock to the rulers. The rulers or pens are placed upon a pen-bar, E, hinged or pivoted upon the frame, so that the pens fall over the top part of the drum B, over which the paper being ruled passes, carried on by the endless belt or apron D. On each end of the drum B are the cams *c c c*, adjustable upon the circumference of the drum, and operating when the latter is turned, the pen-bar E having the pens, and the gate or stop F. The pen-bar E has attached to it, at one end, a lever, *d*, which the cams on this end of the cylinder raise when they pass under it, lifting up the pen-bar E with the pens. The cams on the other end of the cylinder B operate a set of levers, *e e e*, attached to and working the gate or stop F, the construction of which I will now describe. It consists of a rod, G, working in bearings at its ends, the bearings being set in the sides of the frame, so that the rod G crosses the endless belt or apron D at the proper distances from the pens. At equal distances apart are set into the rod G a number of pins, *o o o*, which hang downward, and rest upon or nearly touch the surface of the belt or apron D when they are not lifted by the cams upon the cylinder B, operating the levers *e e e* attached to the gate, and preventing, in this case, the paper from passing this point. The operation of the cams and levers *e e e* attached to the gate is shown in Fig. 3, where the dotted lines show the gate as shut, and the full lines represent it as being lifted by the action of the cams. The small lever *d* upon the pen-bar E may be set at different angles to the apron, thereby regulating the rise and fall of the pens upon the latter when the lever is raised or allowed to fall according to the action of the cams upon the cylinder. The arrangement I use for so setting it is shown in Fig. 4, which I will now explain. It consists in pivoting the lever *d* between two ears, *f f*, upon the pen-bar E, and placing two small set-screws, *g g*, one on each side of the pivot. Now, by tightening one of these screws, which pass through the lever and rest upon a plate upon the pen-bar, and loosening the other, the lever *d* is adjusted to the proper position relative to the apron.

The operation of this device is as follows: The paper is placed upon the belt or apron D, which is carried around by the revolution of the drum-cylinder B. A single sheet is carried at a time under the rulers, and is marked, the cams on the drum lifting the pens as may be desired, according to the manner in which the cams are set, and in a like manner the cams on the other end operating the levers *e e*

*e*, causing the gate or stop F to drop and rise, as may be desired. The same operation is repeated until all the paper be ruled.

In this manner I obtain a simple and effective automatic movement for the purposes required, and one that can be arranged in an endless variety of ways to suit the different styles of ruling and various sizes of sheets, and, by placing the cams directly upon the drum, obtain a compactness which is very desirable.

Having thus fully described my invention, what I claim as new, and desire to secure by Letters Patent, is—

The combination, in a pen ruling-machine, of a frame supporting an endless belt carried around two or more revolving rollers, a revolving cylinder arranged upon the frame inside of the endless belt, over which the paper is carried, one or more sets of cams or projections revolving with said cylinder, a hinged or pivoted pen-bar placed over the cylinder and operated by the cams or projections revolving therewith, and a hinged or pivoted gate placed crosswise of the frame of the machine in front of the cylinder and operated by the cams or projections on said cylinder, substantially as and for the purposes herein set forth.

In testimony that I claim the foregoing I have hereunto set my hand and seal this 31st day of July, 1874.

JESSE F. TAPLEY. [L. S.]

Witnesses:

JOS. C. PYNCHON,

C. L. EVERT.